Dec. 21, 1954   J. J. GLASSER   2,697,611
ALIGNMENT ADAPTER
Filed Feb. 15, 1951   2 Sheets-Sheet 1
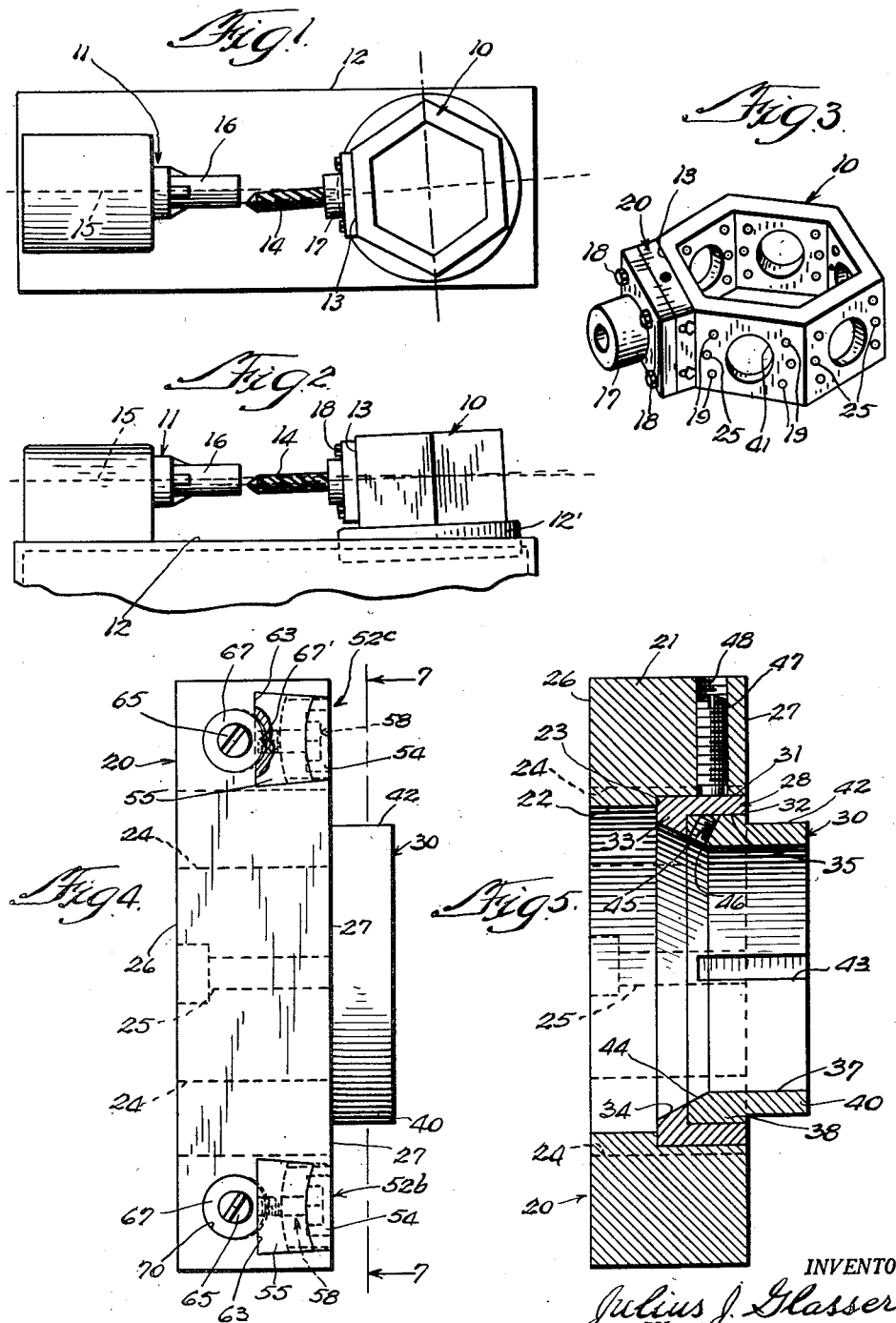
INVENTOR.
Julius J. Glasser
BY
Thiess, Olson & Mecklenburger

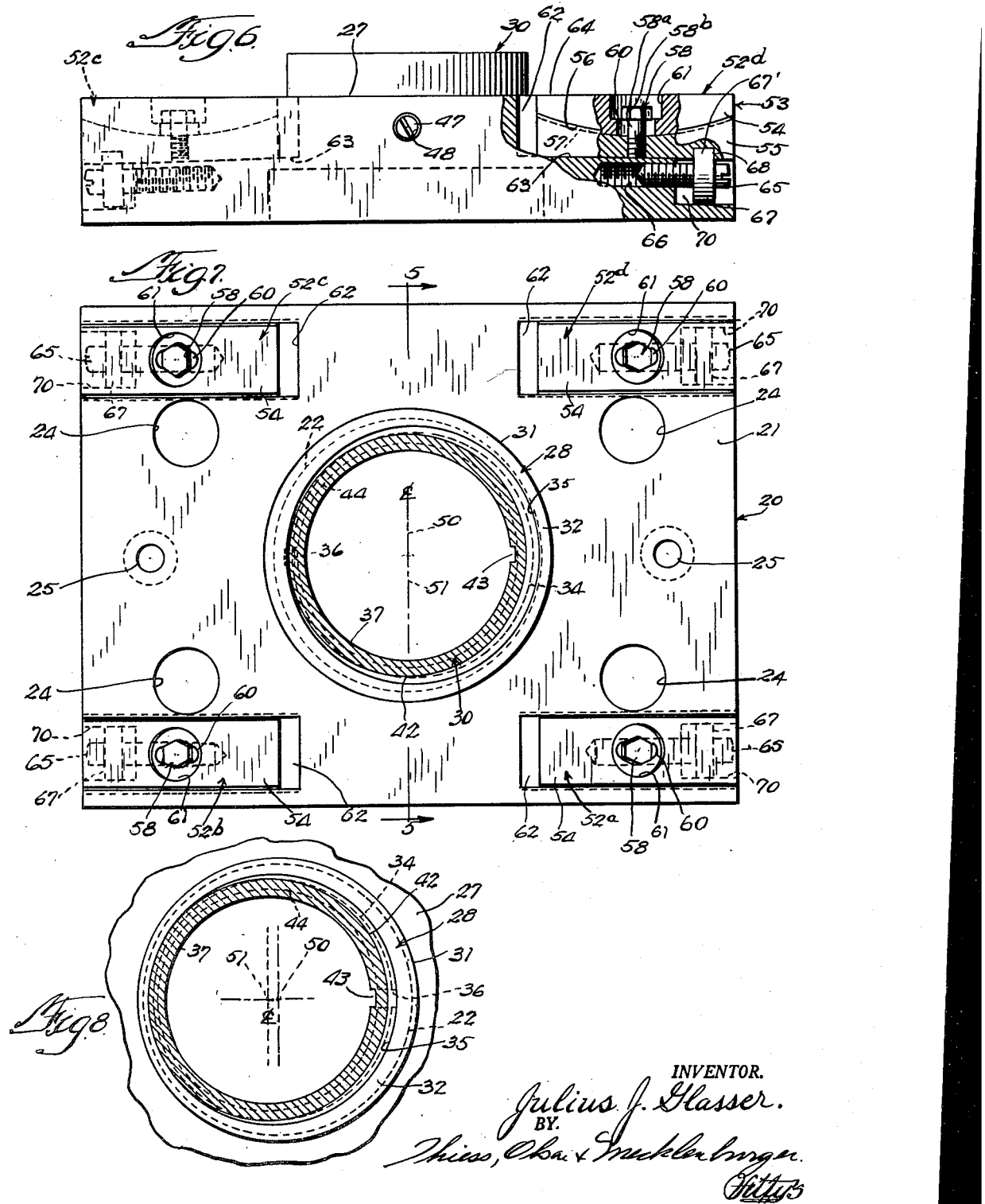

United States Patent Office 2,697,611
Patented Dec. 21, 1954

2,697,611

ALIGNMENT ADAPTER

Julius J. Glasser, Chicago, Ill.

Application February 15, 1951, Serial No. 211,161

5 Claims. (Cl. 279—6)

This invention relates to a tool adapter for use on a lathe or like machine to effect proper alignment of the lathe tool with respect to a work piece mounted on the lathe.

Generally the tool of such a machine is positioned within a tool holder which in turn is mounted on a bored face of a turret, and the work piece to be cut by such tool is held in place by a suitable chuck. Depending upon the type of machine employed, the work piece or tool is rotated while the other remains stationary, and the work piece or tool is movable in a linear path relative to the other. Thus it is apparent that proper alignment of the tool and work piece is essential in order that high quality work can be produced. Furthermore, unless there is proper alignment of these two members undue wear or breakage of the tool is likely to occur.

The turret and chuck often are continuously out of alignment or have a tendency to go out of alignment due to one of several factors such as inherent inaccuracy in the construction and assembling of the machine, uneven wear of the indexing members over a long period of time, or warping of the machine frame due to temperature variations. The effect of these factors on the turret, for example, may be one of the following; (a) the face of the turret, adjacent the chuck and on which the tool is mounted, becomes disposed in a plane which is not perpendicular with respect to the normal centerline or axis of the work piece; (b) even though the face of the turret may be properly disposed in a perpendicular plane, the bore formed in the turret face and in which the tool or tool holder is seated, is not concentric with respect to the normal centerline or axis of the work piece, and (c) a combination of conditions (a) and (b) may exist.

To rectify the above indicated conditions (a), (b), or (c) by partially dismantling the machine and replacing the worn parts has always been an awkward and time-consuming operation.

To eliminate the need for such operation, as above noted, various adapters have heretofore been proposed which are ineffective in compensating for or rectifying the above indicated conditions, particularly condition (c).

Thus it is one of the objects of this invention to provide an adapter which is readily capable of effectively and easily rectifying any out-of-alignment condition which might exist between the tool and work piece.

It is a further object of this invention to provide an adapter which does not require a skilled operator or entail considerable delay to adjust in order to effect proper alignment of the tool and work piece.

It is a still further object of this invention to provide an adapter which is suitable for use on a wide variety of machines.

It is a still further object of this invention to provide an adapter which is simple and compact in construction, effective in operation, and inexpensive to produce.

Further and additional objects will appear from the description, accompanying drawings, and appended claims.

In accordance with one embodiment of this invention an adapter is provided comprising a plate adapted to be mounted on one face of a turret adjacent the work piece, and means adjustably mounted on said plate and engaging said turret to effect perpendicular disposition of the face of the plate, adjacent the work piece, with respect to a predetermined line on the work piece. Adjustably mounted on the plate and cooperating with the tool are a pair of compensating elements for effecting coaxial disposition of the axis of the tool with respect to the predetermined line on the work piece.

For a more complete understanding of this invention reference should be made to the drawings wherein;

Fig. 1 is a diagrammatic top plan view of a lathe turret and chuck showing one position of improper alignment of the turret face with respect to the chuck;

Fig. 2 is a diagrammatic side elevational view of a lathe turret and chuck showing a second position of improper alignment of the turret face with respect to the chuck;

Fig. 3 is a fragmentary perspective view of a turret showing the adapter and tool holder mounted on one of the bored faces of the turret;

Fig. 4 is a left side elevational view of the adapter shown in Fig. 7 having a part of one of the rest members cut away to expose the adjusting screw thereof;

Fig. 5 is a sectional view of the adapter taken along line 5—5 of Fig. 7;

Fig. 6 is a top side elevational view of the adapter having a portion of the plate cut away to expose one of the rest members;

Fig. 7 is a sectional view of the adapter taken along line 7—7 of Fig. 4 and showing the compensating elements relatively positioned so that the bore in the turret face is concentric with respect to the center bore formed in the adapter plate; and Fig. 8 is a fragmentary sectional view of the compensating elements shown in a relative position whereby the centerline of the bore in the turret face is disposed eccentrically the fullest amount with respect to the centerline of the center bore of the adapter plate.

Referring now to the drawings and more particularly to Figs. 1 and 2, a turret 10 and work chuck 11 are shown mounted on the horizontally-disposed work table or bed 12 of a lathe or like machine. In each instance shown in Figs. 1 and 2 the surface 13 of the turret, on which the tool 14 and tool holder 17 are mounted, is shown disposed in a nonperpendicular plane with respect to the centerline or axis 15 of the work piece 16. The condition shown in Fig. 1 is likely to have occurred by reason of warping of the machine frame, or inaccuracy in the assembly of the machine. In Fig. 2, the indexing member or saddle 12', which forms a part of the turret assembly 10, is shown to be unduly worn on one side thereby causing the condition therein shown. Under either condition shown in Figs. 1 and 2, the cutting of the work piece 16 by the tool 14 would be inaccurate and the finished work piece would be of inferior workmanship. To correct either condition by replacement of the necessary parts would be costly and difficult.

In Fig. 3 applicant's adapter 20 is shown mounted between the tool holder 17, which supports tool 14, and surface 13 of the turret 10. The turret 10, in this instance, is of the conventional hexagonal type. The adapter 20 serves to rectify either of the conditions of the turret surface 13 as shown in Figs. 1 and 2 in a manner to be hereinafter described.

The tool holder 17 is secured to the turret surface 13 by means of four holding bolts 18 which extend through suitable openings 24 formed in the adapter and are threaded into corresponding holes 19 formed in turret surface 13. Sufficient clearance is provided between the shanks of bolts 18 and the openings 24 formed in the adapter so as to enable the adapter to assume various adjusted positions with respect thereto. The tool holder 17 has a protuberance, not shown, formed on the back surface thereof which is adapted to seat within a center bore 22 formed in the adapter plate 21, when the tool holder 17 is mounted thereon.

The adapter 20, which forms the subject matter of this invention, comprises a relatively thick plate 21 having formed therein a center bore 22 which is countersunk from the backside 27 thereof so as to provide a shoulder 23. The plate 21, as heretofore mentioned, is provided with a plurality of holes 24 through which the tool holder securing bolts 18 extend. Also formed in plate 21 and disposed on either side of center bore 22 are a pair of holes 25 countersunk from the front side 26 of the plate and adapted to have extended therethrough securing bolts, not shown, whch are threaded into tapped holes 25' provided on turret surface 13 and thus fasten the adapter plate to the turret. As in the case of holes 24, there is also sufficient clearance between the countersunk holes 25 and the shanks of the securing bolts so as to allow adjustment of the adapter relative to the turret surface 13. The front and back sides 26 and 27, respectively, of the adapter plate 21 are substantially flat and perpendicular with respect to the axis 50 of the center bore 22.

Disposed within the countersunk portion of center bore 22 of plate 21, and exposed from the back side 27 of the plate are a pair of compensating rings 28 and 30. Ring 30 is the smaller of the two and is adjustably mounted within the other, see Fig. 5. Ring 28 has the outer periphery 31 thereof in slidable engagement with the surface of the countersunk portion of bore 22. The axes of bore 22 and outer periphery 31 of the outer ring 28 are coincident. The portion of outer ring 28, which abuts shoulder 23, is in the form of an inwardly extending annular shoulder or flange 33. The inner peripheral surface 34 of flange 33 is tapered, as seen in Fig. 5. The rear edge portion 32 of outer ring 28 is flush with the plane of backside 27 of plate 21. The opening 35 formed in ring 28 is eccentrically disposed with respect to the axis of the outer peripheral surface 31 of the ring and also the axis 50 of bore 22. An elongated slot 36 is formed in the tapered, peripheral flange surface 34 of ring 28. The slot 36 is positioned at a point on surface 34 where the distance between the peripheral surface of opening 35 and outer peripheral surface 31 of ring 28 is the greatest.

The smaller or inner ring 30 has a portion 38 of its outer periphery abutting annular flange 33 and in slidable engagement with the peripheral surface of opening 35 formed in ring 28. The remaining outer peripheral portion 40 of ring 30 is in the form of a sleeve which projects rearwardly from backside 27 of the plate 21 and is insertable in a bore 41 formed in the turret surface 13. The sleevelike portion 40 and the bore 41 are in relatively close engagement with respect to one another. Ring 30 is provided with an opening 37 having the axis thereof disposed concentrically with respect to the peripheral surface 42 of sleevelike portion 40 and eccentrically with respect to the peripheral surface of portion 38. The inner end 44 of opening 37 is flared outwardly, as shown in Fig. 5. The tapered surface 44 of opening 37, affords accessibility to the locking screw 45, to be more fully described hereinafter. An axially extending slot 43 is formed in the peripheral surface of opening 37 so as to aid in moving ring 30 to various positions of adjustment relative to ring 28 and also to indicate the point on ring 30 wherein the distance between the peripheral surface 42 of sleevelike portion 40 and the outer peripheral surface of portion 38 of the ring is the greatest.

Ring 30 may be held in a relatively fixed position of adjustment with respect to ring 28 by means of a locking screw 45 which is threadably mounted within an opening 46 formed in ring 30, as seen in Fig. 5. Opening 46 is positioned at an angle so that the screw 45 may be readily adjusted from the front side 26 of the plate. Outer ring 28 is held in various positions of rotational adjustment by means of a locking screw 47 which is threadably mounted within an opening 48 formed in plate 21, see Fig. 5.

By relative adjustment of the rings 28 and 30, the axis 50 of center bore 22 of plate 21 and the axis 51 of the peripheral surface 42 of inner ring 30 may assume a coincident relationship, as seen in Fig. 7, or a fully eccentric relationship, as seen in Fig. 8. When the axes are coincident to one another, the slots 36 and 43 formed in rings 28 and 30, respectively, are diametrically opposed to one another. On the other hand, when the axes 50 and 51 assume the greatest offset position with respect to one another, the slots 36 and 43 are moved to the same relative position, as seen in Fig. 8. Thus the relative disposition of bore 22 and periperal surface 42 may vary from one of concentricity to one of relatively large eccentricity.

Adjustably mounted on the backside 27 of plate 21 are a plurality of rest members or footings 52a, 52b, 52c, and 52d, which are arranged in a symmetrical fashion with respect to center bore 22, see Figs. 4, 5, and 7. The rest members are of like construction and, therefore, only rest member 52d will be described in detail.

Rest member 52d comprises a block 53 which is formed of upper and lower sections 54 and 55, respectively. The surface 56 of section 54, which is adjacent to section 55, is substantially convex and is in slidable engagement with a corresponding concave surface 57 formed in section 55. The two sections 54 and 55 are loosely connected to one another by means of a bolt 58, the shank 58a of which extends through an elongated slot 60 formed in section 54 and is threadably mounted within lower section 55. The head 58b of the bolt 58 is positioned within an oversize opening 61 formed in upper section 54 and provides access of the bolt head 58b.

The block 53 is slidably mounted within a substantially wedge-shaped slot or groove 62 formed in the backside 27 of plate 21. A groove 62 is arranged at each of the four corners of plate 21 as seen in Fig. 7. The bottom surface 63 of the groove 62, on which the lower section 55 of block 53 slidably engages, is inclined upwardly a slight amount from the open side of the groove.

The block 53 is adapted to be moved longitudinally of the groove 62 by means of an adjusting screw 65 which is threadably mounted in an opening 66 formed in plate 21. The axis of the screw 65 is parallel with respect to sloping bottom surface 63 of groove 62. Formed on the outer end of screw 65 is an oversized annular collar or flange 67 having the upper peripheral surface 67′ thereof disposed within a suitable slot 68 formed in the underside of lower section 55 of block 53. Threaded opening 66 has the exposed end 70 thereof countersunk and is adapted to accommodate collar 67. The depth of the countersunk portion 70 is dependent upon the amount of relative movement of the block 63 within groove 62. Upon threading of screw 65 into opening 66, the block 53 is caused to move up the inclined surface 63 of groove 62 thereby resulting in the upper surface 64 of block 53 to project beyond the plane of backside 27 of plate 21. The amount that block 53 protrudes beyond backside 27 is dependent upon the distance the block has traversed up the inclined surface 63. By adjusting each of the rest members accordingly, the operator is able to compensate for the offset disposition of the turret surface 13 as illustrated in Figs. 1 and 2. To overcome the condition shown in Fig. 1, the rest members 52b and 52c should be adjusted so that the surfaces 64 of the blocks would project beyond backside 27 while the surfaces 64 of the remaining blocks assume a flush position with respect to the back side. To rectify the condition seen in Fig. 2, the operator should adjust rest members 52c and 52d so that the surfaces 64 thereof would project beyond backside 27 of plate 21 while the surfaces 64 of the other rest members remain in a flushed relation therewith.

Surface 64 of block 53 when projected from backside 27 engages turret surface 13 and by reason of the arcuate shape of the cooperating surfaces 56 and 57 of sections 54 and 55, respectively, the upper section 54 is adapted to be self-aligning with respect to the abutted turret surface.

Thus it will be seen that an adapter has been provided which enables the operator to readily compensate for any irregularities occurring between the disposition of the turret surface and the axis 15 of the work piece 16 so that the front surface 26 of the adapter upon which the tool holder 17 is mounted is in a perpendicular position with respect to the axis 15. Furthermore, compensating rings have been provided which enable the operator, even though the surface on which the tool holder is mounted is in proper perpendicular disposition to the work axis 15, to cause the axis of the tool 14, which is coincident to the axis 50 of opening 22 of plate 21 to be brought into coaxial relationship with work axis 15. By reason of the simplicity of construction of these rest members and compensating rings, an unskilled operator may readily make proper alignment of the tool or tool holder with respect to the work piece, thereby effecting more accurate forming of the work piece and also prolonging the life of the cutting tool. It will be further seen that the adapter is of such a construction that it may be used in combination with a wide variety of machines.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

I claim:

1. A device for use in aligning a tool mounted on the bored face of a lathe turret with respect to a work piece held in the lathe chuck, comprising a tool-supporting member mountable on and having one surface thereof in abutting relation with the bored face of such a turret, said member having a second surface in a fixed substantially parallel relation with respect to said abutting surface and disposed adjacent such a work piece, said member being provided with an opening extending transversely with respect to said parallel surfaces, adjustable means mounted on the abutting surface of said member and engageable with the turret bored face for effecting a perpendicular disposition of said second surface with respect to a predetermined line on the work piece, and a pair of apertured compensating elements one of which rotatably mounted within said member opening and has one of the apertures thereof eccentrically offset with respect to the axis of rotation thereof and the second of which is rotatably mounted within the eccentrically disposed aperture of said other element, said second element being provided with an eccentrically disposed opening for accommodating such a tool, said elements being adjustable independently of one another to effect coaxial alignment of the axis of the tool with respect to a predetermined line on said work piece.

2. A device for use in aligning a tool mounted on a carriage of a machine with respect to a work piece mounted on said machine, comprising a tool-supporting member mountable on said carriage and having one side thereof substantially flat and adjacent said work piece, said member provided with an opening disposed transverse with respect to said one side and adapted to receive said tool, adjustable means mounted on said member and engageable with said carriage for effecting perpendicular disposition of said one side with respect to a predetermined line on said work piece, and a pair of compensating rings each of which is eccentrically formed and is rotatably mounted within said opening and in embraceable relationship with said tool, said rings being adjustable relative to one another to effect coaxial alignment of the axis of the tool with respect to said predetermined line.

3. A device for use in aligning a tool mounted on a carriage of a machine with respect to a work piece mounted on said machine, comprising a tool-supporting member mountable on said carriage and having the front and backsides of said member substantially flat, said backside being disposed adjacent said carriage and having formed therein a plurality of recesses, and adjustable means mounted on said member for effecting perpendicular disposition of said front side with respect to a predetermined line on said work piece, said means comprising a plurality of rest pieces, one of said pieces being slidably mounted within one of said recesses and adapted when slidably adjusted in one direction to project beyond the plane of said backside and engage said carriage.

4. A device for use in aligning a tool mounted on a carriage of a machine with respect to a work piece mounted on said machine, comprising a tool-supporting member mountable on said carriage and having the front and backsides of said member substantially flat, said backside being disposed adjacent said carriage and having formed therein a plurality of recesses, and adjustable means disposed within said recesses for effecting perpendicular disposition of said front side with respect to a predetermined line on said work piece, said means comprising a plurality of rest pieces, each of said pieces comprising a pair of cooperating sections arranged in juxtaposed position with respect to one another, one of said sections being slidably disposed within said recess and the other of said sections being adjustably mounted on said one section and adapted upon slidable movement of said one section in one direction to project beyond the plane of said backside and engage said carriage.

5. A device for use in aligning a tool mounted on a carriage of a machine with respect to a work piece mounted on said machine, comprising a tool-supporting member mountable on said carriage and having the front and backsides of said member substantially flat, said backside being disposed adjacent said carriage and having formed therein a plurality of recesses, and adjustable means mounted on said backside and engageable with said carriage for effecting perpendicular disposition of said front side with respect to a predetermined line on said work piece; said means comprising a plurality of rest pieces disposed within said recesses, each piece comprising a pair of cooperating sections arranged in juxtaposed relation with respect to each other, one of the sections being disposed within said recess for movement relative thereto, and the other of said sections being adjustably secured to said one section and adapted to abut and be self-aligning with respect to the adjacent surface of said carriage upon relative movement in one direction of said one section within said recess.

References Cited in the file of this patent

UNITED STATES PATENTS

| Number | Name | Date |
|---|---|---|
| 159,180 | Holt | Jan. 26, 1875 |
| 375,011 | Shaw | Dec. 20, 1887 |
| 843,376 | Tombragel et al. | Feb. 5, 1907 |
| 895,788 | Potter | Aug. 11, 1908 |
| 963,559 | Hines | July 5, 1910 |
| 1,000,011 | Johnson et al. | Aug. 8, 1911 |
| 1,065,774 | Breault | June 24, 1913 |
| 1,745,525 | Bissell | Feb. 4, 1930 |
| 2,276,945 | Ehrich | Mar. 17, 1942 |
| 2,486,044 | Lusk | Oct. 25, 1949 |
| 2,513,606 | Wahnish | July 4, 1950 |